US011803148B2

(12) United States Patent
Ono

(10) Patent No.: US 11,803,148 B2
(45) Date of Patent: Oct. 31, 2023

(54) ELECTRIC HEATING DEVICE WITH ENDLESS BELT

(71) Applicant: HEWLETT-PACKARD DEVELOPMENT COMPANY, L.P., Spring, TX (US)

(72) Inventor: Manabu Ono, Kanagawa (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/782,740

(22) PCT Filed: Oct. 15, 2020

(86) PCT No.: PCT/US2020/055710
§ 371 (c)(1),
(2) Date: Jun. 6, 2022

(87) PCT Pub. No.: WO2021/118684
PCT Pub. Date: Jun. 17, 2021

(65) Prior Publication Data
US 2023/0017998 A1    Jan. 19, 2023

(30) Foreign Application Priority Data
Dec. 13, 2019    (JP) ................................ 2019-225630

(51) Int. Cl.
*G03G 15/20* (2006.01)
*H05B 3/54* (2006.01)
*B82Y 30/00* (2011.01)
(52) U.S. Cl.
CPC .......... *G03G 15/2057* (2013.01); *H05B 3/54* (2013.01); *B82Y 30/00* (2013.01); *G03G 2215/2035* (2013.01); *H05B 2203/016* (2013.01)

(58) Field of Classification Search
CPC .......... G03G 15/2017; G03G 15/2039; G03G 15/2053; G03G 15/2057; G03G 2215/2003; G03G 2215/2016
See application file for complete search history.

(56) References Cited

U.S. PATENT DOCUMENTS

2010/0055365 A1    3/2010    Nakajima et al.
2013/0045034 A1    2/2013    Yoshida et al.
(Continued)

FOREIGN PATENT DOCUMENTS

JP    2009-109998 A    5/2009
JP    2012-78453 A    4/2012
(Continued)

OTHER PUBLICATIONS

JP 2018112647 English machine translation, Ono, Jul. 19, 2018 (Year: 2018).*

(Continued)

*Primary Examiner* — Thomas S Giampaolo, II
(74) *Attorney, Agent, or Firm* — Foley & Lardner LLP

(57) ABSTRACT

An electrothermal heating device for heating a print medium includes an endless belt, a first electrode and a second electrode. The endless belt rotates in a rotational direction about a rotation axis that defines an axial direction, so as to generate heat when the endless belt rotates and is supplied with power. The endless belt includes a base portion made of a nanocomposite material having a carbon filler. The first and second electrodes are in contact with the base portion of the endless belt. The first and second electrodes extend in the axial direction of the endless belt, and are spaced apart in the rotational direction of the endless belt. A volume resistivity of the base portion of the endless belt in the rotational direction is less than a volume resistivity of the base portion in the axial direction.

17 Claims, 11 Drawing Sheets

(56) References Cited

U.S. PATENT DOCUMENTS

2013/0101302 A1\*   4/2013   Ishigai .............. G03G 15/2057
                                                           399/33
2016/0091847 A1    3/2016   Mukoyama et al.

FOREIGN PATENT DOCUMENTS

| JP | 2013-142847 A | 7/2013 |
| JP | 2015-203816 A | 11/2015 |
| JP | 2016-108560 A | 6/2016 |
| JP | 2016-109928 A | 6/2016 |
| JP | 6149098 B1 | 6/2017 |
| JP | 2017-227876 A | 12/2017 |
| JP | 2018-112647 A | 7/2018 |

OTHER PUBLICATIONS

JP 2016108560 English machine translation, Ono et al., Jun. 20, 2016 (Year: 2016).\*

\* cited by examiner

ELECTRIC HEATING DEVICE WITH ENDLESS BELT

BACKGROUND

Some imaging apparatuses include a fixing device in the form of an electrothermal heating device for heating a sheet member. A toner image having been transferred to a recording medium is fixed by the fixing device to a surface of the recording medium by heating and/or pressing.

DETAILED DESCRIPTION

The power consumed by a fixing operation may represent a high proportion of the total power consumed by the imaging apparatus. Some fixing devices that are devised to reduce the power consumption, include a belt-shaped fixing member made of a polyimide resin composition in which a filler having thermal conductivity is dispersed. Other fixing devices are devised to reduce the power consumption by heating the fixing member itself.

In the following description, with reference to the drawings, the same reference numbers are assigned to the same components or to similar components having the same function, and overlapping description is omitted.

An example electrothermal heating device includes an endless belt which generates heat when supplied with power (energized), and first and second electrode portions which extend in an axial direction of the endless belt while contacting the endless belt and are arranged (spaced apart or positioned) in a rotation direction (or rotational direction) of the endless belt. The endless belt includes a base portion (or a base layer or inner layer, e.g., heat generation layer 51*a* in FIG. 6), that is made of a base material corresponding to a nanocomposite material in which a carbon filler is dispersed. The volume resistivity of the base portion of the endless belt in the rotation direction is set to be less than the volume resistivity of the base portion of the endless belt in the axial direction.

The example electrothermal heating device be used in, for example, a fixing device mounted on an electrophotographic imaging apparatus.

Figure 1:
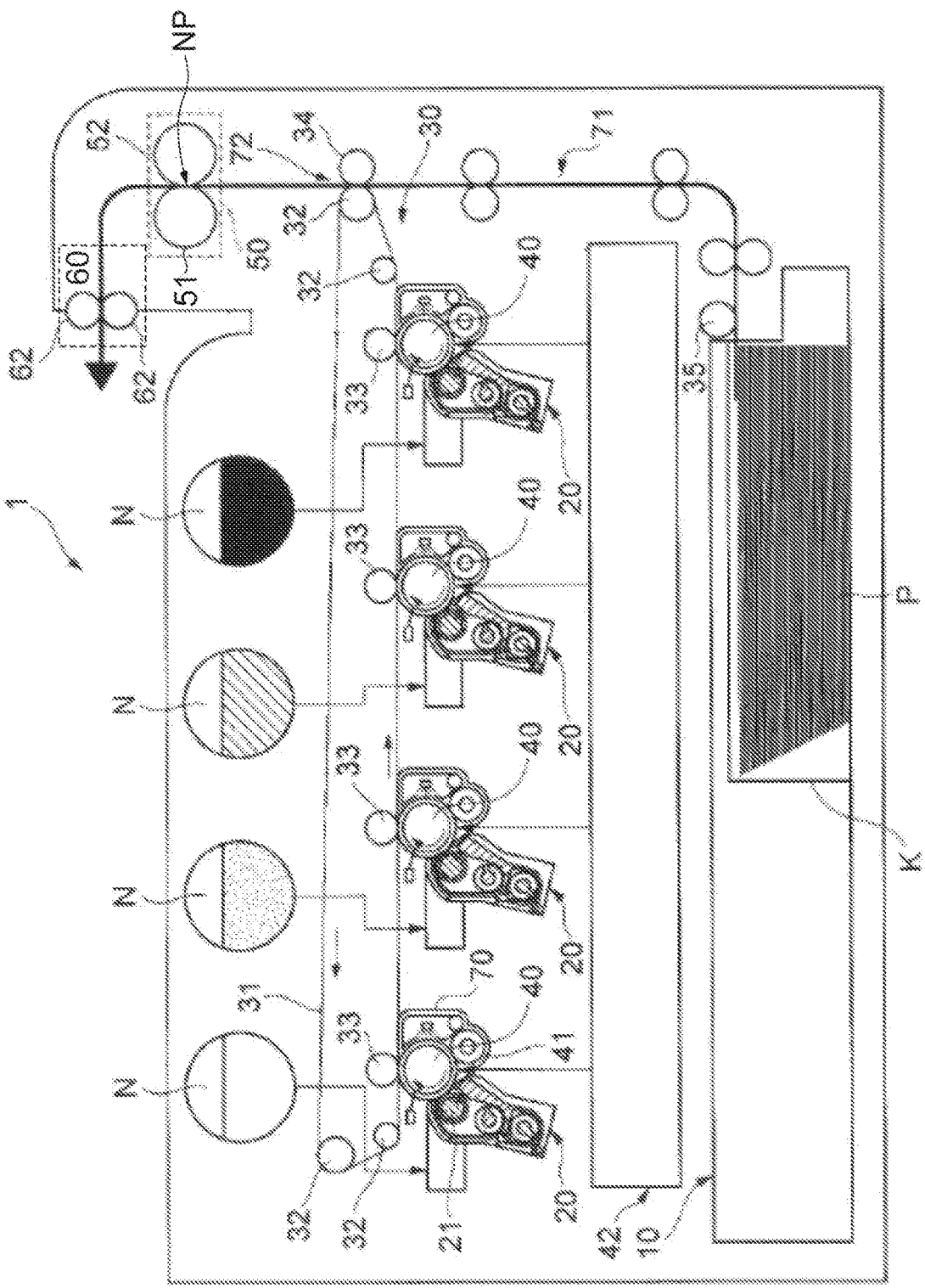
FIG. 1 is a schematic diagram of an imaging apparatus that is equipped with an example electrothermal heating device as a fixing device.

With reference to FIG. 1, an example imaging apparatus 1 may form a color image by using toner of the colors of cyan, magenta, yellow and black (CMYK). The example imaging apparatus 1 may include a conveying device 10 which conveys a recording medium P corresponding to a sheet (e.g., a sheet of paper), a developing device 20 which develops an electrostatic latent image, a transfer device 30 which transfers a toner image to the recording medium P, an image carrier (e.g., photosensitive drum) 40 which forms an electrostatic latent image thereon, a fixing device 50 which is an electrothermal heating device that fixes a toner image to the recording medium P, and a discharge device 60 which discharges the recording medium P. In the present description, the developing device 20 may refer to one or more developing devices associated with the cyan, magenta, yellow, and black toners, and the image carrier 40 may refer one or more image carriers (or photosensitive drums) associated with the cyan, magenta, yellow, and black toners.

The conveying device 10 may convey the recording medium P which may be a sheet having an image formed thereon along a conveyance route 71. The recording medium P is accommodated in a cassette K as stacked sheets, and each sheet is picked up by a feeding roller 35. The conveying device 10 directs the recording medium P to reach a secondary transfer region 72 along the conveyance route 71 when the toner image to be transferred to the recording medium P reaches the secondary transfer region 72.

Four developing devices 20 are provided respectively, for the four colors. Each of the developing devices 20 includes a developing roller 21 which supplied toner to an associated one of the image carriers 40. The developing device 20 adjusts a toner and a carrier to a targeted mixing ratio. The developing device 20 mixes and stirs the toner and the carrier so as to disperse the toner. By the adjusting and stirring operations, a developer charged with a targeted charge amount may be obtained. This developer is carried on the developing roller 21. The developing roller 21 rotates to carry the developer to a region facing the associated image carrier 40. The toner contained in the developer that is carried on the developing roller 21 is transferred to the electrostatic latent image formed on the peripheral surface of the image carrier 40, so as to develop the electrostatic latent image with the transferred toner.

The transfer device 30 may convey the toner image formed on the developing device 20 to the secondary transfer region 72 where the toner image is secondarily transferred to the recording medium P. The transfer device 30 may include a transfer belt 31, a suspension roller 32, a primary transfer roller 33, and a secondary transfer roller 34. The suspension roller 32 suspends (or supports) the transfer belt 31. The primary transfer roller 33 positions the transfer belt 31 between the primary transfer roller 33 and the image carrier 40. The secondary transfer roller 34 positions the transfer belt 31 between the secondary transfer roller 34 and the suspension roller 32.

The transfer belt 31 may be an endless belt which moves in a circulating manner by the suspension roller 32. Four primary transfer rollers 33 are provided, one for each of the colors of CMYK. Each of the primary transfer rollers 33 may be disposed to press the transfer belt 31 against an associated one of the image carriers 40 from an inner peripheral side of the transfer belt 31. The secondary transfer roller 34 may be disposed to press the suspension roller 32 against the transfer belt 31 from an outer peripheral side of the transfer belt 31.

Four image carriers 40, for example photosensitive drums, may be provided, one for each of the colors of CMYK. The image carriers 40 may be located adjacent the respective the developing devices 20. The image carriers 40 are arranged along the movement direction of the transfer belt 31. About each of the image carriers 40 are provided the associated developing device 20, a charging roller 41, an exposure unit (or exposure device) 42, and a cleaning unit (or cleaning device) 70. In the present description, the charging roller 41 may refer to one or more charging rollers, the exposure device 42 may refer to one or more exposure devices 42, and the cleaning unit 70 may refer to one or more cleaning unit 70. For example, with reference to FIG. 1, the imaging apparatus 1 includes four charging rollers 41, four exposure devices 42, four cleaning devices 70 associated with the cyan, magenta, yellow, and black toners, respectively. In addition, four toner tanks N are filled with the cyan, magenta, yellow and black toners, respectively, to supply the four developing devices 20, respectively.

The charging roller 41 charges the surface of the image carrier 40 to a predetermined or targeted potential. The charging roller 41 rotates in accordance with a rotation of the image carrier 40. The exposure unit 42 exposes the surface of the image carrier 40 charged by the charging roller 41 in response to an image formed on the recording medium P, so as to change a potential of a portion exposed by the exposure unit 42 in the surface of the image carrier 40. As a result, an electrostatic latent image is formed in accordance with the change in potential. Each of the four developing devices 20 develops an associated electrostatic latent image that is formed on the associated image carrier 40 by the toner supplied from an associated one of the toner tanks N, to generate a toner image. The cleaning unit 70 collects the toner remaining on the image carrier 40 after the toner image formed on the image carrier 40 is primarily transferred to the transfer belt 31.

The fixing device 50 may fix the toner image secondarily transferred from the transfer belt 31 to the recording medium P by heating the toner image while pressing the toner image against the recording medium P, as part of a fixing operation. The fixing device 50 includes an endless belt 51 which heats the recording medium P and a pressing roller 52 which is pressed against the endless belt 51. The endless belt 51 is formed in a cylindrical shape and includes the base portion, e.g., heat generation layer 51*a* in FIG. 6 that forms the inner peripheral surface of the endless belt 51, which can generate heat when supplied with power. A nip portion NP is formed as a contact portion between the endless belt 51 and the pressing roller 52. The toner image is fixed to the recording medium P in such a manner that the base portion of the endless belt 51 generates heat when the recording medium P passes through the nip portion NP.

The discharge device 60 may include a pair of discharge rollers 62 that discharge the recording medium P having the toner image fixed thereto to the outside of the imaging apparatus 1.

Still with reference to FIG. 1, a printing process carried out by the example imaging apparatus 1 will be described. When an image signal of a recording target image is input to the imaging apparatus 1, a control unit (or controller) of the imaging apparatus 1 operates the feeding roller 35 to rotate in order to pick up and convey the recording medium P stacked in the cassette K. In a charging operation for each of the charging rollers 41, the control unit causes the charging roller 41 to charge the surface of the image carrier 40 to a predetermined or targeted potential. In an exposure operation for each of the exposure units 42, the control unit causes the exposure unit 42 to form an electrostatic latent image by irradiating a laser beam to the surface of the image carrier 40 based on the received image signal.

In a developing operation, the electrostatic latent image is developed in each of the developing devices 20 so as to form a toner image. In a primary transfer operation, a resulting toner image is primarily transferred from the image carrier 40 to the transfer belt 31 at a region where the image carrier 40 faces the transfer belt 31. The toner images of respective colors formed on the image carrier 40 are sequentially layered on the transfer belt 31 so as to form an unfixed toner image. In a secondary transfer operation, the unfixed toner image is secondarily transferred to the recording medium P at the secondary transfer region 72 where the suspension roller 32 faces the secondary transfer roller 34.

The recording medium P having the unfixed toner image is conveyed to the fixing device 50. The recording medium P is conveyed to pass between the endless belt 51 and the pressing roller 52 while being heated and pressed so as to fix the unfixed toner image to the surface of the recording medium P. The recording medium P is further discharged to the outside of the imaging apparatus 1 by the discharge roller 62.

Figure 2:
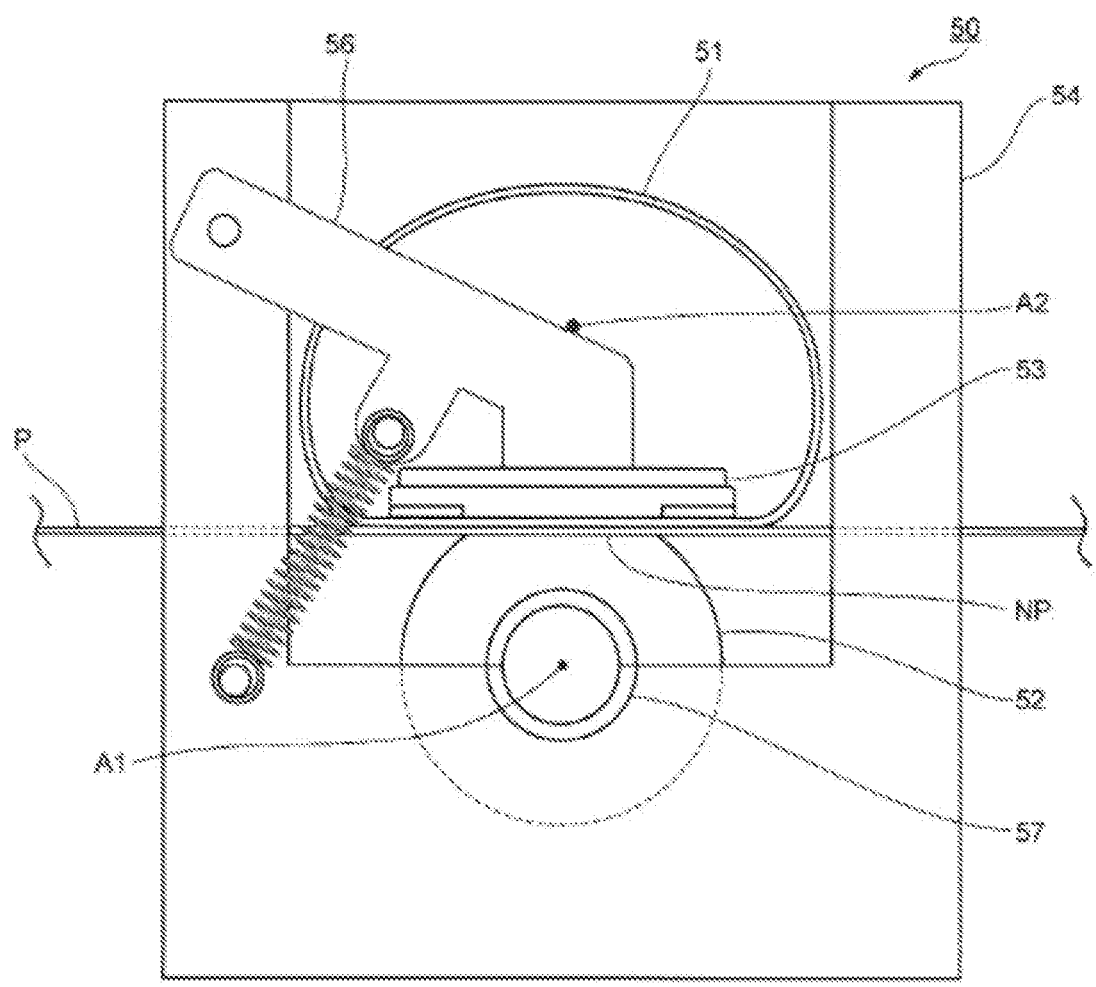
FIG. 2 is a schematic side view of the example electrothermal heating device which includes an endless belt and a pressing roller.
Figure 3:
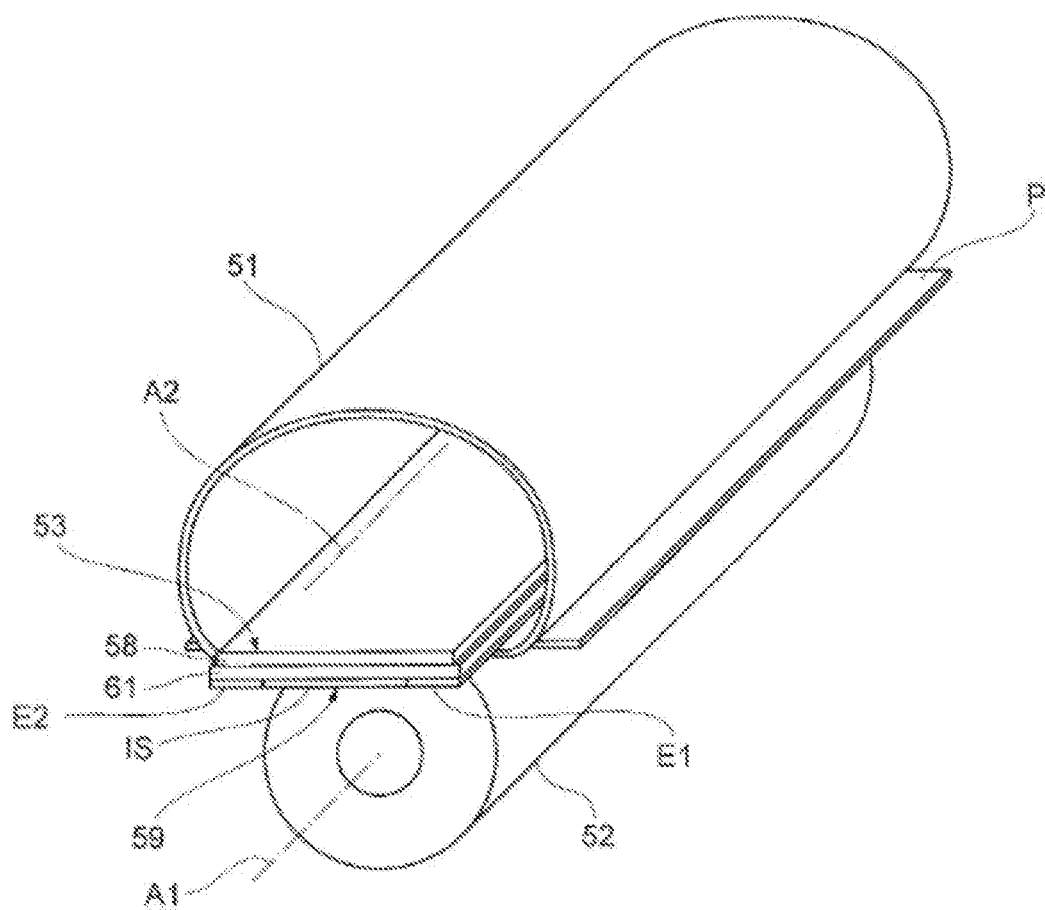
FIG. 3 is a schematic perspective view of the example electrothermal heating device.

With reference to FIGS. 2 and 3, the example fixing device 50 includes the endless belt 51, the pressing roller 52, a pressing member 53, a pressing mechanism 56, and a casing 54. The fixing device 50 fixes the toner image to the recording medium P by applying heat and pressure thereto. The endless belt 51 rotates and is supplied with power to generate heat so as to operate as a fixing heater. The casing 54 supports the pressing roller 52 to rotate. The pressing roller 52 has a rotation axis that extends in the axial direction A1, and is driven, by a motor for example, to rotate around its rotation axis. The endless belt 51 is disposed adjacent (e.g. on a peripheral edge of) the pressing roller 52. The pressing member 53 is disposed inside the endless belt 51 and the pressing mechanism 56*s* urges the pressing member 53 toward the pressing roller 52 by. A nip portion NP is formed between endless belt 51 and the pressing roller 52. The endless belt 51 rotates in a driven manner in accordance with the rotation of the pressing roller 52. The pressing member 53 includes a first electrode portion E1 and a second electrode portion E2 extending in the axial direction of the endless belt 51 and positioned to on opposite sides (e.g., upstream and downstream sides) of the nip portion NP. For example, the first electrode portion E1 may be located on an upstream side of the nip portion in the rotational direction of the endless belt 51. The first electrode portion E1 and the second electrode portion E2 contact the inner peripheral surface of the endless belt 51, formed by the base portion, e.g., heat generation layer 51*a* (cf. FIG. 6). The endless belt 51 moving between the first electrode portion E1 and the second electrode portion E2 generates heat by electric power supplied from a power supply device to the endless belt 51, via the first electrode portion E1 and the second electrode portion E2 so that the toner image on the recording medium P is fixed in the nip portion NP.

Figure 4:
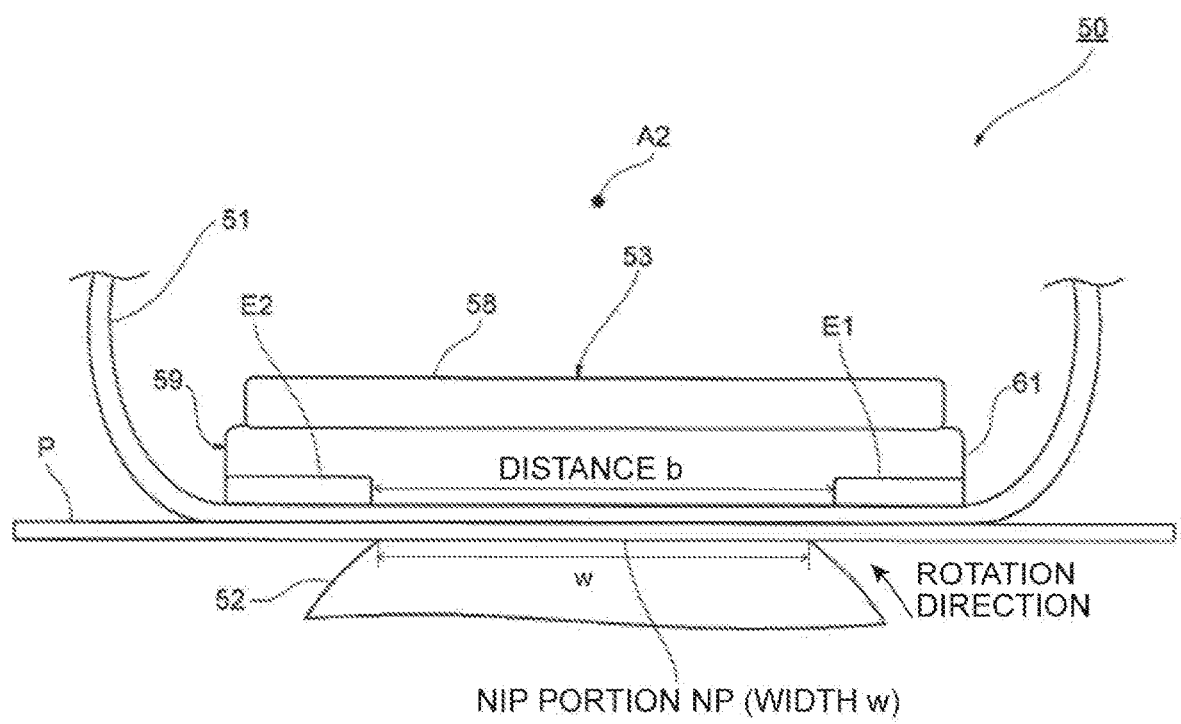
FIG. 4 is a schematic cross-sectional view of a portion of the example electrothermal heating device illustrating a nip portion between the endless belt and the pressing roller.

With reference to FIG. 4, the pressing member 53 includes a frame 58 and an electrode unit (or electrode device) 59. The frame 58 and the electrode unit 59 may be integrated into a single device. The frame 58 and the electrode unit 59 extend in an axial direction A2 that is oriented along a rotation axis of the endless belt 51. The frame 58 has opposite ends that protrude from the openings formed at respective end portions of the endless belt 51 (cf. FIG. 3). A pressing force is applied to the protruding end portion of the frame 58 by the pressing mechanism 56 (cf. FIG. 2). Accordingly, the frame 58 presses the endless belt 51 toward the pressing roller 52 in a direction intersecting the axial direction A2 of the endless belt 51. The frame 58 has a rigidity so as to be inhibited or prevented from warping when force is applied to the opposite ends of the frame 58 and a reaction force is received from the pressing roller 52.

The pressing roller 52 is rotatable around the rotation axis that is oriented in the axial direction A1. The pressing roller 52 includes, for example, a heat-resistant elastic layer having heat resistance and elasticity, such as silicone rubber for example. In some examples, the pressing roller 52 may include a release layer having a releasability property, such as a fluororesin, that is provided on the outer peripheral surface of the pressing roller 52. The nip portion NP has a width w (hereinafter, referred to as a "nip width w") in the rotation direction of the pressing roller 52 that may vary depending on the elastic deformation amount of the pressing roller in reaction to the pressing force transmitted from the pressing mechanism 56. The width is set such that the toner image on the recording medium P can be suitably heated and pressed to achieve fixing.

Figure 5:
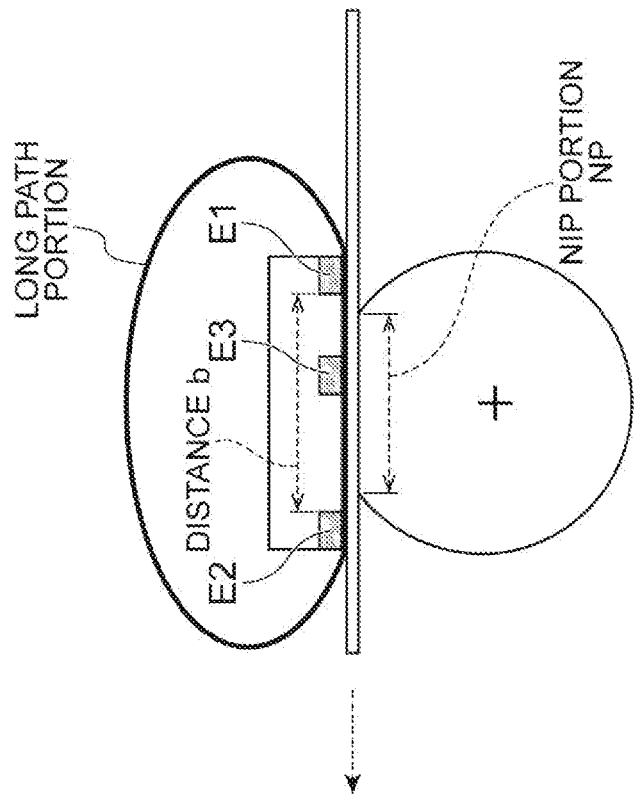
FIG. 5A is a schematic cross-sectional view of an example electrothermal heating device, illustrating an endless belt equipped with two electrode portions.
FIG. 5B is a schematic cross-sectional view of an example electrothermal heating device, illustrating an endless belt equipped with three electrode portions.

The electrode unit 59 includes the first electrode portion E1, the second electrode portion E2, and an electrode support portion 61. The first electrode portion E1 and the second electrode portion E2 are provided in the electrode support portion 61 to face the endless belt 51. Each of the first electrode portion E1 and the second electrode portion E2 has a plate shape and extends in the axial direction A2 of the endless belt 51. The first electrode portion E1 is spaced apart from (e.g., separated from) the second electrode portion E2 by a distance b in a direction intersecting the direction of the axial direction A2. The frame 58 can urge the first electrode portion E1 and the second electrode portion E2 toward the base portion forming the inner peripheral surface of the endless belt 51, by the pressing force generated from the pressing mechanism 56. With reference to FIG. 5A, the electrode portion for supplying electric power to the endless belt 51 includes the first electrode portion E1 and the second electrode portion E2. A current path of the endless belt 51 is split between a short path passing through the nip portion NP (referred to as a "short path") and a long path which does not pass through the nip portion NP (referred to as a "long path"). Accordingly, a current flow through the short path tends to contribute more to the fixing operation than through the long path. The heat generation amount of the short path portion and of the heat generation amount of the long path portion, respectively correlate with the reciprocal of the inter-electrode distances of the respective portions. The inter-electrode distance in the case of the short path corresponds to the distance b. The inter-electrode distance of the short path portion is set to be sufficiently shorter than the inter-electrode distance of the long path portion, so that the short path portion which contributes more to the fixing operation is instantaneously heated to a target temperature with a substantially low voltage applied, and so that the heat generation of the long path portion which does not directly contribute to the fixing operation, is suppressed. Accordingly, the toner image on the recording medium P can be fixed in a more efficient manner with less electric power. In some examples, with reference to FIG. 5B, the fixing device 50 can include an additional electrode portion such as a third electrode portion for supplying electric power to the endless belt 51 to the short path portion (between the first electrode portion E1 and the second electrode portion E2). The third electrode portion E3 may be added between the first electrode portion E1 and the second electrode portion E2, to set each section to a different heat generation state by dividing the short path portion such that the first electrode portion E1 and the second electrode portion E2 have the same first polarity and the third electrode portion E3 has a second polarity different from the first polarity. The fixing operation can be carried out in this way on various recording media. In the above-described example fixing operation, the short path portion of the endless belt 51 and adjacent portions to the short path are repeatedly subjected to heat radiation, so as to increase self-heating and heat shock. In some examples, the distance b of the short path along the endless belt 51 is set to include the nip portion NP, in order to further reduce the influence of the repeated heat radiation.

According to examples, the base portion, e.g., heat generation layer 51*a* (cf. FIG. 6) of the endless belt 51 is made of the nanocomposite material in which a carbon filler is dispersed. Heat is generated by supplying electric power to the base portion of the endless belt 51.

A composite material tends to decrease in strength when subjected to repeated deformation by an external force which causes a shear stress or a deviation stress occurs in an internal structure of the composite material. This tendency is accelerated or increased by repeated power supply and heat shock. When the endless belt has composite material in which a conductive material is dispersed, a conductive path formed by the conductive material tends to gradually break, in addition to the decrease in strength due to the repeated fixing operation, thereby increasing resistance in the endless belt. In such a composite material, the voltage applied would have to be gradually increased to maintain a targeted heat generation amount during a state of continuous use.

In the example electrothermal heating device (e.g., the fixing device 50), the volume resistivity A of the endless belt 51 in the rotation direction is set to be less than the volume resistivity B of the endless belt 51 in the axial direction. In order to maintain the conductive path, the effect of the internal stress generated during the rotation of the endless belt may be reduced. A ratio of the volume resistivity A in the rotation direction with respect to the volume resistivity B in the axial direction will be referred to as the "volume resistivity ratio A/B" and may be of 0.50 to 0.95 according to examples, in order to inhibit an increase in the voltage applied during the continuous use of the endless belt 51. In some examples, the volume resistivity ratio A/B may be of 0.60 to 0.85 to stabilize the rotation of the endless belt under a heat generating state and to reduce unevenness of gloss on the fixed image.

The thickness of the base portion e.g., heat generation layer 51*a* (cf. FIG. 6) of the endless belt 51 may be of 30 μm to 100 μm according to some examples, or of 45 μm to 90 μm according to other examples. The base portion of the endless belt 51 is set such that the volume resistivity A of the endless belt 51 in the rotation direction is less than the volume resistivity B of the endless belt 51 in the axial direction, as described above, in order to minimize the thickness of the base portion of the endless belt 51, so as to impart strength and resilience to the endless belt 51 and to maintain a low voltage applied by the electric power supply.

The nanocomposite material used in the base portion of the endless belt 51 is composited on a nanoscale and includes a carbon filler dispersed in a matrix material.

Examples of the carbon filler used in the base portion of the endless belt 51, include carbon fibers, carbon nanotubes (CNT), and whiskers of a carbon-based material and these can be used alone or in combination. In some examples, CNT is used. In some examples, the carbon filler is associated with a diameter (e.g., a particle diameter or average particle diameter) of 2 nm to 20 nm, and with a length to diameter ratio (which may be referred to as an "aspect ratio" or "dimension ratio") of 100 to 15,000. The particle diameter does not exceed 20 nm and the aspect ratio is no less than 100, in order to form a suitable conductive path. Additionally, the aspect ratio does not exceed 15,000, in order to better disperse the carbon filler in the matrix material.

The content of the carbon filler may be 3% by mass to 25% by mass according to some examples, and may be of 5% by mass to 20% by mass in other examples. The content of the carbon filler has a minimum of 3% to 5% by mass, in order to obtain sufficient heat generation characteristics, and a maximum of 20% to 25% by mass to prevent the base portion of the endless belt 51 to be too rigid such that the mechanical strength is impaired and the adjustment of the volume resistivity ratio A/B is difficult.

Examples of the matrix material used in the base portion of the endless belt 51, include a polyimide resin or a polyamideimide resin, which may be used alone or in combination, in order to achieve targeted heat generation characteristics, targeted mechanical characteristics, increased thermal stability, increased chemical stability, and the like.

The base portion of the endless belt 51 is produced so that the volume resistivity A of the endless belt 51 in the rotation direction is less than the volume resistivity B of the endless belt 51 in the axial direction. The base portion of the endless belt 51 can be produced by using example production methods as will be described. The base portion can be processed and molded as follows. In some examples, a coating liquid in which a carbon filler is dispersed in a matrix material, is applied to a metal mold, and is subsequently dried or heated, and additionally fired (e.g., subjected to a flame) as the case may be. In some examples, a raw material of the matrix material dissolved or dissolved and heated in a solvent is applied to a metal mold, and is subsequently dried or heated, and additionally fired (e.g., subjected to a flame) as the case may be. In examples in which a coating liquid including a carbon filler of a specific shape dispersed, is applied onto a surface of a metal mold by discharging from a dispenser or the like having a small-diameter discharge port, the orientation state of the carbon filler in the endless belt can be adjusted, so as to achieve targeted characteristics for the endless belt.

An example method of producing the base portion of the endless belt 51 with a nanocomposite material in which a carbon filler is dispersed in a polyimide resin will be described. A coating liquid is prepared by dispersing a carbon filler in N-methylpyrrolidone (NMP) varnish (as a polyimide precursor. The coating liquid is applied in a spiral shape from a first end of a cylindrical metal mold toward a second end opposite the first end, while rotating the cylindrical metal mold, to form a coating film. The polyimide precursor is imidized by firing (e.g., exposing to a flame) after heating and drying the coating film to thereby produce the base portion of the endless belt 51. According to examples, the carbon filler used has an aspect ratio of 100 to 15,000, so that a ratio between the volume resistivity in the coating direction (e.g., the axial direction of the cylindrical metal mold) and the volume resistivity in an orthogonal direction (e.g., the rotation direction of the cylindrical metal mold) that is orthogonal to the coating direction, can be more easily adjusted.

Figure 6:
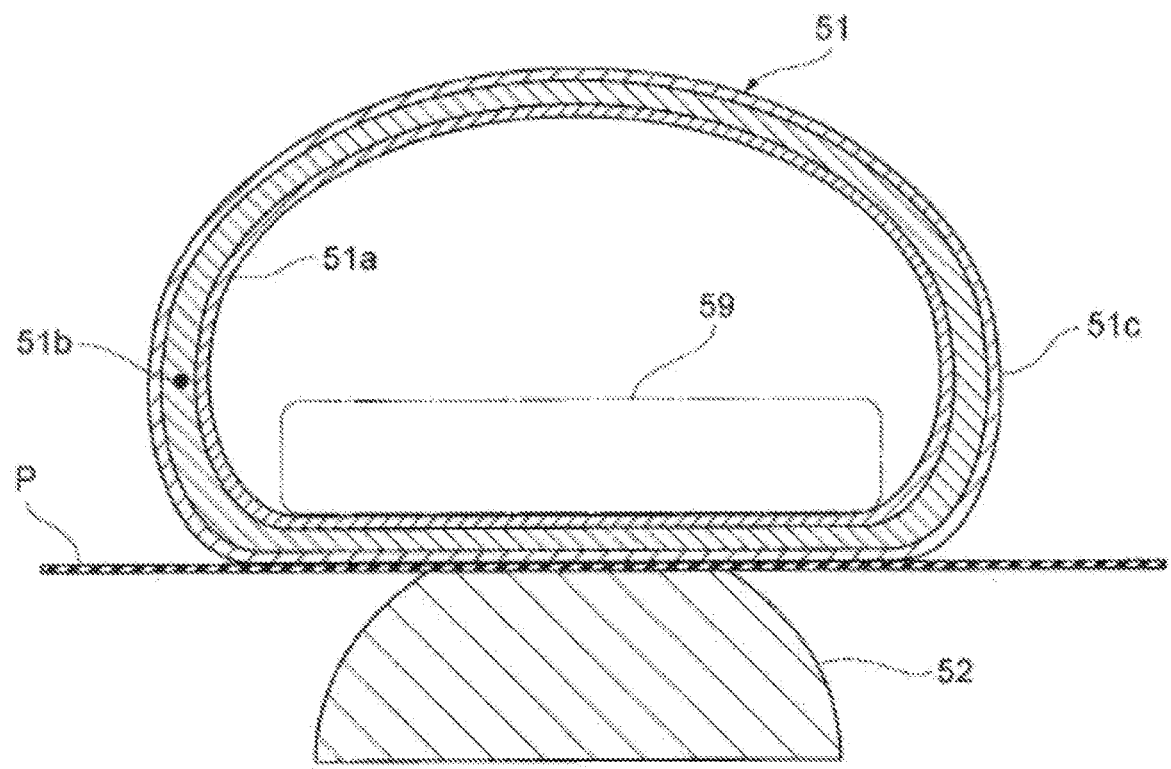
FIG. 6 is a schematic cross-sectional view of an example electrothermal heating device, illustrating the endless belt which includes a heat generation layer, an intermediate layer and a surface layer.

With reference to FIG. 6, the endless belt 51 may include a heat generation layer 51*a*, an intermediate layer 51*b* and a surface layer 51*c* that are laminated or adhered with adhesive layers interposed therebetween. The heat generation layer 51*a* forms the base portion made of a nanocomposite material having a carbon filler dispersed therein. In some examples, the intermediate layer 51*b* can be omitted. In such a case, the surface layer 51*c* is laminated directly on the heat generation layer 51*a* or with an adhesive layer interposed therebetween.

According to examples, the intermediate layer 51*b* may include a material selected to have a suitable heat resistance and elasticity, such as silicone rubber for example, so as to impart the endless belt 51 with a suitable elasticity. For example, the intermediate layer 51*b* can be produced by curing a liquid silicone rubber that applied on the heat generation layer 51*a*. The elasticity of the intermediate layer 51*b* may reduce an external force applied to the base portion (e.g., heat generation layer 51*a*) of the endless belt 51, in order to maintain the conductive path by reducing the influence of the internal stress caused by the rotation of the endless belt. The thickness of the intermediate layer 51*b* may be of 0.3 mm to 3 mm. The thickness of the intermediate layer 51*b* is set to a minimum of 0.3 mm to achieve a sufficient effect of elasticity, and is set to a maximum of 3 mm to impart the base portion with sufficient flexibility.

The outer peripheral surface of the endless belt 51 may be formed on the surface layer 51*c*. The surface layer 51*c* may include materials having suitable heat resistance and release properties such as fluororesins. Examples of such materials include polytetrafluoroethylene (PTFE), perfluoroalkoxy fluororesin (PFA), and ethylene tetrafluoride/propylene hexafluoride copolymer (FEP). Further, these fluorine-based resins and the like may include additives dispersed therein to impart flame retardancy and an antistatic property. The surface layer 51*c* may be formed by a method of sintering the applied fluororesin in some examples, or a method of coating the fluororesin tube in other examples. The thickness of the surface layer 51*c* may correspond to ½ or less of the thickness of the base portion (e.g., the heat generation layer 51*a*) of the endless belt 51 and the volume resistivity of the surface layer 51*c* may be ten times or more the volume resistivity A of the base portion (e.g., the heat generation layer 51*a*) in the rotation direction. The thickness of the surface layer 51*c* may be at most ½ of the thickness of the base portion (e.g., the heat generation layer 51*a*) of the endless belt 51, to impart a suitable flexibility to the base portion (e.g., the heat generation layer 51*a*) of the endless belt 51. In addition, the volume resistivity of the surface layer 51*c* may be at least ten times the volume resistivity A of the base portion in the rotation direction, to prevent a formation of a new power supply path inside the endless belt. If such a new power supply path is formed, the efficiency of the power supply to the heat generation layer 51*a* may be reduced.

Examples of materials of the first electrode portion E1 and the second electrode portion E2 may include, for example, a thin metal plate of copper, zinc, or aluminum or a material printed with a carbon-based conductive paint. The height of the first electrode portion E1 and the height of the second electrode portion E2 may be 1.5 times or less the thickness of the heat generation layer 51a. The electrodes E1 and E2 contribute to minimizing the heat radiation of the heat energy generated in the heat generation layer 51a, which in turns reduce the deterioration of the base portion (e.g., the heat generation layer 51a) of the endless belt 51 due to heat shock.

The electrode support portion 61 may include a material having high resistance or insulation. In some examples, the material has low thermal conductivity and/or a suitable surface smoothness (e.g., slipperiness). Examples of such material include polytetrafluoroethylene (PTFE), perfluoroalkoxy fluororesin (PFA), and ethylene tetrafluoride/propylene hexafluoride copolymer (FEP). The electrode support portion 61 has a shape capable of fixing the first electrode portion E1 and the second electrode portion E2.

Endless belt production examples will be described.

Production Example 1 of Endless Belt

A dispersion treatment was performed using a high-shear disperser to obtain "NMP dispersion of CNT", by stirring and mixing the following components:
 1 part by mass of CNT-A, which is a multi-layered carbon nanotube having a diameter of 11 nm and a length of 10 μm; and
 40 parts by mass of NMP.

Next, a mixture was obtained from the following components:
 41 parts by mass of the NMP dispersion of CNT;
 50 parts by mass of NMP varnish of polyimide precursor (solid content; 18% by mass); and
 10 parts by mass of NMP.

The mixture obtained was subjected to a dispersion treatment using three roll mills and was further subjected to a defoaming treatment to obtain a "coating liquid".

Next, the coating liquid obtained as described above was introduced into a dispenser and a coating layer of the coating liquid was formed according to a "dispenser coating method" of applying a spiral shape of a coating liquid around a rotating cylindrical support body made of stainless used steel (SUS), while displacing the dispenser in the axial direction (e.g., longitudinal direction) of the cylindrical support body.

Then, heating/firing (e.g., exposing to a flame) was performed gradually while maintaining the rotation of the cylindrical support body so as to dry and imidize the coating layer. After cooling, a tube-shaped polyimide composition was peeled/recovered from the cylindrical support body to obtain an "endless belt-1" in which "CNT-A" was dispersed at 10 wt %.

The thickness of the "endless belt-1" obtained was 65 μm, the volume resistivity in a heated state was 0.17 Ω·cm in the rotation direction and was 0.23 in the axial direction, and a ratio of the volume resistivity in the rotation direction and the axial direction (hereinafter, referred to as a volume resistivity ratio) was 0.74.

Production Example 2 of Endless Belt

An "endless belt-2" was obtained similarly to "Production Example 1 of the endless belt" with the exception that the following raw material was used:
 1.5 parts by mass of CNT-B, which is a multi-layered carbon nanotube having a diameter of 10 nm and a length of 2 μm;
 47 parts by mass of NMP varnish of polyimide precursor (solid content; 18% by mass); and
 50 parts by mass of NMP.

In the "endless belt-2" obtained, "CNT-B" was dispersed at 15 wt % and the thickness was 65 μm. The details such as the volume resistivity of the obtained "endless belt-2" are shown in Table 1A appearing further below.

Production Example 3 of Endless Belt

An "endless belt-3" was obtained similarly to "Production Example 2 of the endless belt" with the exception that the amount of "CNT-B" was changed to 0.5 part by mass and the amount of the "NMP varnish of polyimide precursor" was changed to 53 parts by mass.

In the "endless belt-3" obtained, "CNT-B" was dispersed at 5 wt % and the thickness was 65 μm. The details such as the volume resistivity of the obtained "endless belt-3" are shown in Table 1A further below.

Production Example 4 of Endless Belt

An "endless belt-4" was obtained similarly to "Production Example 1 of the endless belt" with the exception that the following raw material was used:
 2 parts by mass of CNT-C, which is a single-layered carbon nanotube having a diameter of 2 nm and a length of 5 μm;
 45 parts by mass of NMP varnish of polyimide precursor (solid content; 18% by mass); and
 50 parts by mass of NMP.

In the "endless belt-4" obtained, "CNT-C" was dispersed at 20 wt % and the thickness was 65 μm. The details such as the volume resistivity of the obtained "endless belt-4" are shown in Table 1A further below.

Production Example 5 of Endless Belt

An "endless belt-5" was obtained similarly to "Production Example 4 of the endless belt" with the exception that the amount of "CNT-C" was changed to 2.5 parts by mass and the amount of the "NMP varnish of polyimide precursor" was changed to 42 parts by mass.

In the "endless belt-5" obtained, "CNT-C" was dispersed at 25 wt % and the thickness was 65 μm. The details such as the volume resistivity of the obtained "endless belt-5" are shown in Table 1B further below.

Production Example 6 of Endless Belt

An "endless belt-6" was obtained similarly to "Production Example 1 of the endless belt" with the exception that the following raw material was used:
 2 parts by mass of CNT-D, which is a multi-layered carbon nanotube having a diameter of 15 nm and a length of 150 μm;
 45 parts by mass of NMP varnish of polyimide precursor (solid content; 18% by mass); and
 50 parts by mass of NMP.

In the "endless belt-6" obtained, "CNT-D" was dispersed at 20 wt % and the thickness was 65 μm. The details such as the volume resistivity of the obtained "endless belt-6" are shown in Table 1B further below.

Comparative Production Example 1 of Endless Belt

The following raw materials were pre-mixed to obtain a mixture:

1 part by mass of CNT-E, which is a vapor-grown carbon fiber having a diameter of 150 nm and a length of 8 μm;

55 parts by mass of NMP varnish of polyimide precursor (solid content; 18% by mass); and 50 parts by mass of NMP.

The mixture was subjected to a dispersion treatment using three roll mills. A "comparative endless belt-1" was obtained by the same method as "Production Example 1 of the endless belt" with the exception that a coating liquid was obtained by performing a defoaming treatment.

In the "comparative endless belt-1" obtained, "CNT-E" was dispersed at 10 wt % and the thickness was 65 μm. The evaluation result of the volume resistivity of the obtained "comparative endless belt-1" is shown in Table 1B.

Comparative Production Example 2 of Endless Belt

A coating liquid was prepared similarly to "Comparative Production Example 1 of the endless belt" with the exception that the amount of "CNT-E" was changed to 3 parts by mass and the amount of the "NMP varnish of polyimide precursor" was changed to 39 parts by mass. A "comparative endless belt-2" was obtained similarly to "Comparative Production Example 1 of the endless belt" with the exception that the coating liquid was coated on the cylindrical support body using a ring coating method.

In the obtained "endless belt-2", "CNT-E" was dispersed at 30 wt % and the thickness was 65 μm. The details such as the volume resistivity of the obtained "comparative endless belt-2" are shown in Table 1B further below.

TABLE 1A

| | | Production Examples of endless belt | | | |
|---|---|---|---|---|---|
| | | Example 1 | Example 2 | Example 3 | Example 4 |
| Carbon filler | Type | CNT-A (※1) | CNT-B (※1) | CNT-B (※1) | CNT-C (※2) |
| | Content [mass %] | 10 | 15 | 5 | 20 |
| | Diameter [nm] | 11 | 10 | 10 | 2 |
| | Length [μm] | 10 | 2 | 2 | 5 |
| | Aspect ratio | 909 | 200 | 200 | 2,500 |
| Endless belt | Type | Endless belt-1 | Endless belt-2 | Endless belt-3 | Endless belt-4 |
| | Coating method | (※4) | (※4) | (※4) | (※4) |
| | Thickness of base portion [μm] | 65 | 65 | 65 | 65 |
| Volume resistivity [Ω · cm] | Rotation direction; A | 0.17 | 0.14 | 0.34 | 0.13 |
| | Axial direction; B | 0.23 | 0.22 | 0.36 | 0.16 |
| | Volume resistivity ratio (A/B) | 0.74 | 0.64 | 0.94 | 0.81 |

※1: Multi-layered carbon nanotube
※2: Single-layered carbon nanotube
※3: Vapor-grown carbon fiber
※4: Dispenser coating method
※5: Ring coating method

TABLE 1B

| | | Production Examples of endless belt | | Comparative Production Examples of endless belt | |
|---|---|---|---|---|---|
| | | Example 5 | Example 6 | Comp. Example 1 | Comp. Example 2 |
| Carbon filler | Type | CNT-C (※2) | CNT-D (※1) | CNT-E (※3) | CNT-E (※3) |
| | Content [mass %] | 25 | 5 | 10 | 20 |
| | Diameter [nm] | 2 | 15 | 150 | 150 |
| | Length [μm] | 5 | 150 | 8 | 8 |
| | Aspect ratio | 2,500 | 10,000 | 53 | 53 |
| Endless belt | Type | Endless belt-5 | Endless belt-6 | Comp. Endless belt-1 | Comp. Endless belt-2 |
| | Coating method | (※4) | (※4) | (※4) | (※5) |
| | Thickness of base portion [μm] | 65 | 65 | 65 | 65 |
| Volume resistivity [Ω · cm] | Rotation direction; A | 0.11 | 0.24 | 0.12 | |
| | Axial direction; B | 0.14 | 0.21 | 0.12 | |
| | Volume resistivity ratio (A/B) | 0.79 | 0.52 | 1.14 | 1.00 |

Figure 7:
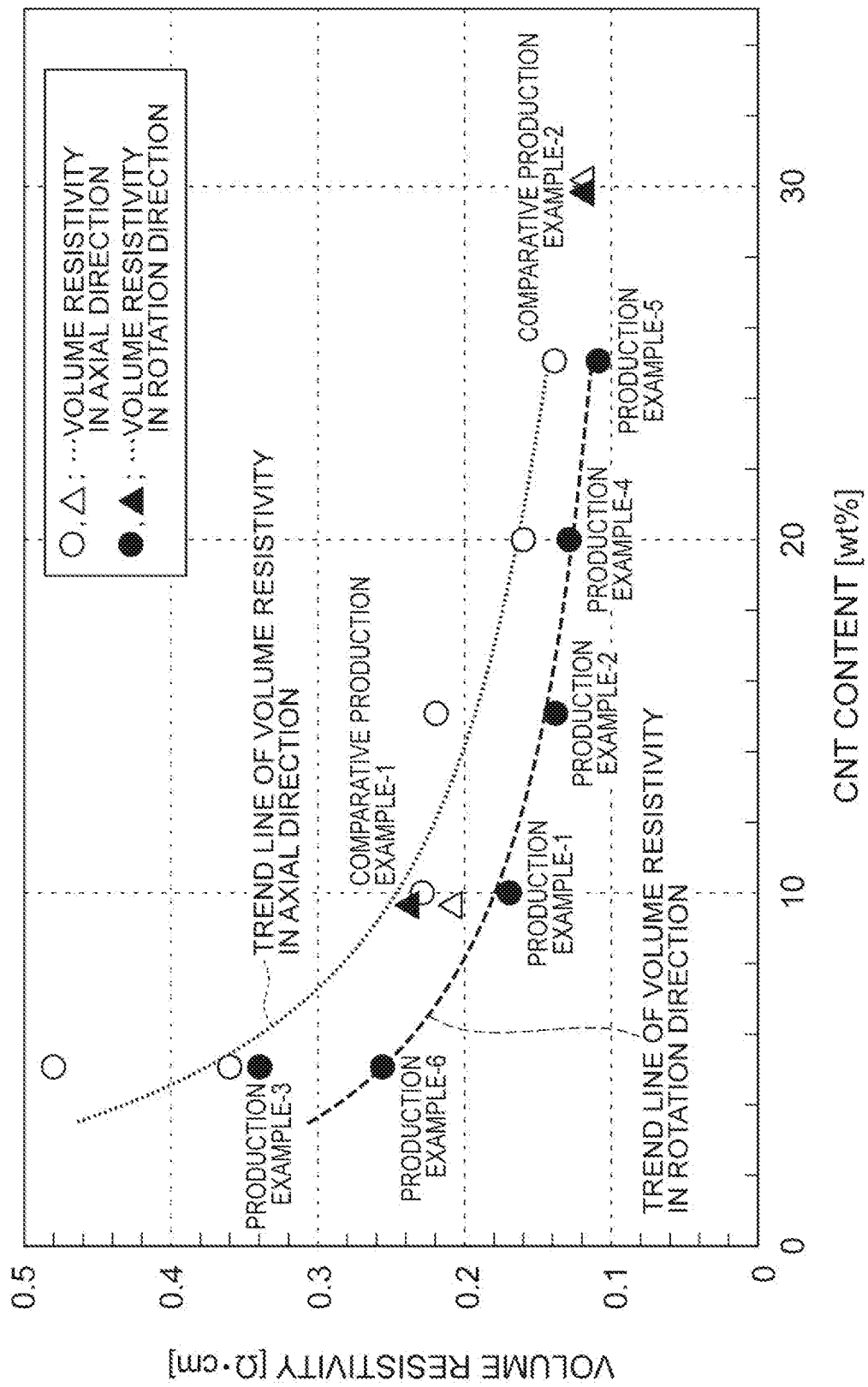
FIG. 7 is a graph of a volume resistivity in the rotational direction of the endless belt and of a volume resistivity in the axial direction of the endless belt with respect to carbon nanotubes (CNT) content.

※1: Multi-layered carbon nanotube
※2: Single-layered carbon nanotube
※3: Vapor-grown carbon fiber
※4: Dispenser coating method
※5: Ring coating method FIG. 7 shows graph plotting results of the volume resistivities in the rotation direction and the axial direction in relation to CNT content, in a heated state of the "endless belt-1" to "the endless belt-6" obtained by "Production Example 1" to "Production Example 6", respectively, and of the "comparative endless belt-1" and the "comparative endless belt-2" obtained by "Comparative Production Example 1" and "Comparative Production Example 2", respectively, in relation with the CNT content.

In the "endless belt-1" to the "endless belt-6", the trend line of the volume resistivity in the rotation direction (illustrated by black circles ● in the graph) in a heated state is lower than a trend line of the volume resistivity in the axial direction (illustrated by white circles ○ in the graph). Since the "endless belt-1" to the "endless belt-6" are produced so that the volume resistivity in the rotation direction is less than the volume resistivity in the axial direction using a coating liquid containing CNT having a specific shape, the energy supply is more efficient in the rotation direction, which contributes to the heat generation.

The endless belt having the above-described characteristics is brought into contact with the first electrode portion and the second electrode portion extending in the axial direction of the endless belt and spaced apart in the rotation direction of the endless belt, and coating direction of the coating liquid, the power supply direction of the endless belt, and the movement direction (the rotation direction) of the endless belt are respectively combined so as to match the circumferential direction of the endless belt, so as to achieve suitable characteristics of the electrothermal heating device with the endless belt generating heat when supplied with power.

Example 1

A fixing device SL-M2020WXAA (manufactured by Samsung Electronics Co., Ltd. and having a printing speed up to 21 ppm) corresponding to a monochrome printer using an electrophotographic system was replaced with a fixing device such as the fixing device illustrated in FIG. 2, and was modified for testing. An external power supply device was connected to the electrode portion of the fixing device and a voltage applied from the outside of the modified test machine to the electrode portion was adjusted so as to control the heat generation state of the endless belt.

A printout test was performed while adjusting the voltage applied to the electrode portion using the "endless belt-1" obtained by "Production Example 1 of the endless belt". An initial voltage E0 of 16.0V was applied for maintaining the fixing rate of the toner image so as not to fall below 90%. The maximum meandering amount L of the heated endless belt-1 was 1 mm.

After performing continuous printing for 50,000 sheets, a voltage E1 applied for maintaining the fixing rate of the toner image so as not to fall below 90% was evaluated again. The voltage E1 applied was of 16.2 V, a variation ΔE (corresponding to E1-E0) with respect to the initial applied voltage E0 was +0.2 V, and the initial state was maintained in a state considered "very good", as will be described further below.

The test conditions and evaluation criteria for each evaluation item are as follows.

1. Volume Resistivity of Endless Belt During Heating

Figure 8:
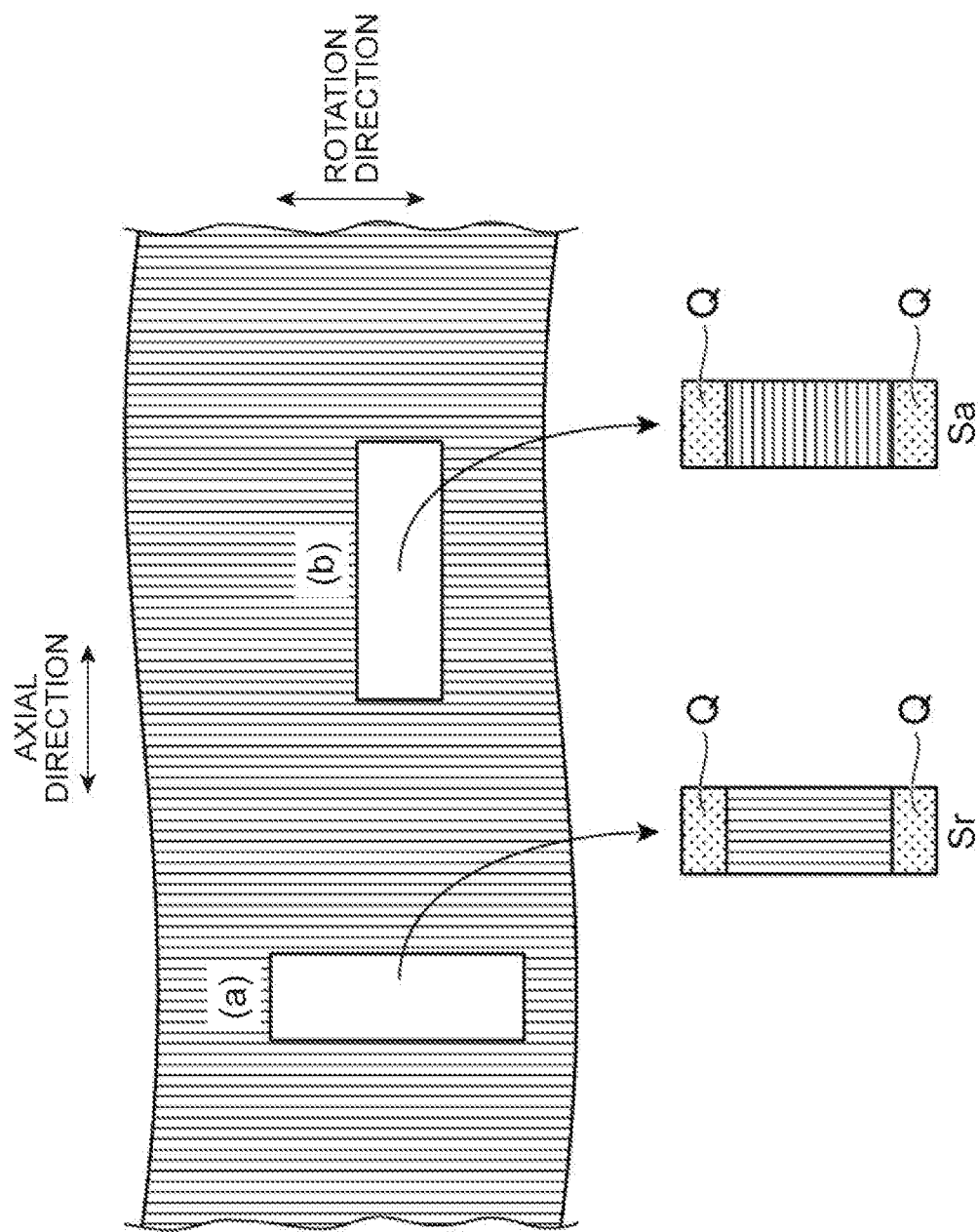
FIG. 8 is a diagram illustrating an example method of preparing a test piece for a rotational direction and a test piece for an axial direction of an endless belt.

After cutting the endless belt in the axial direction, a rectangular piece (dimensions: 10 mm×100 mm) was cut out so as to be parallel to the rotation direction and the axial direction (for example, (a) of FIG. 8). Next, a conductive copper foil adhesive tape Q was attached to one surface of both short sides of the small piece at distances of 90 mm to obtain a test piece Sr for the rotation direction. Similarly, a small piece was cut out in the axial direction (for example, (b) of FIG. 8) to obtain a test piece Sa for the axial direction. The testing was carried out on each of the test pieces Sr, Sa as follows.

Figure 9:
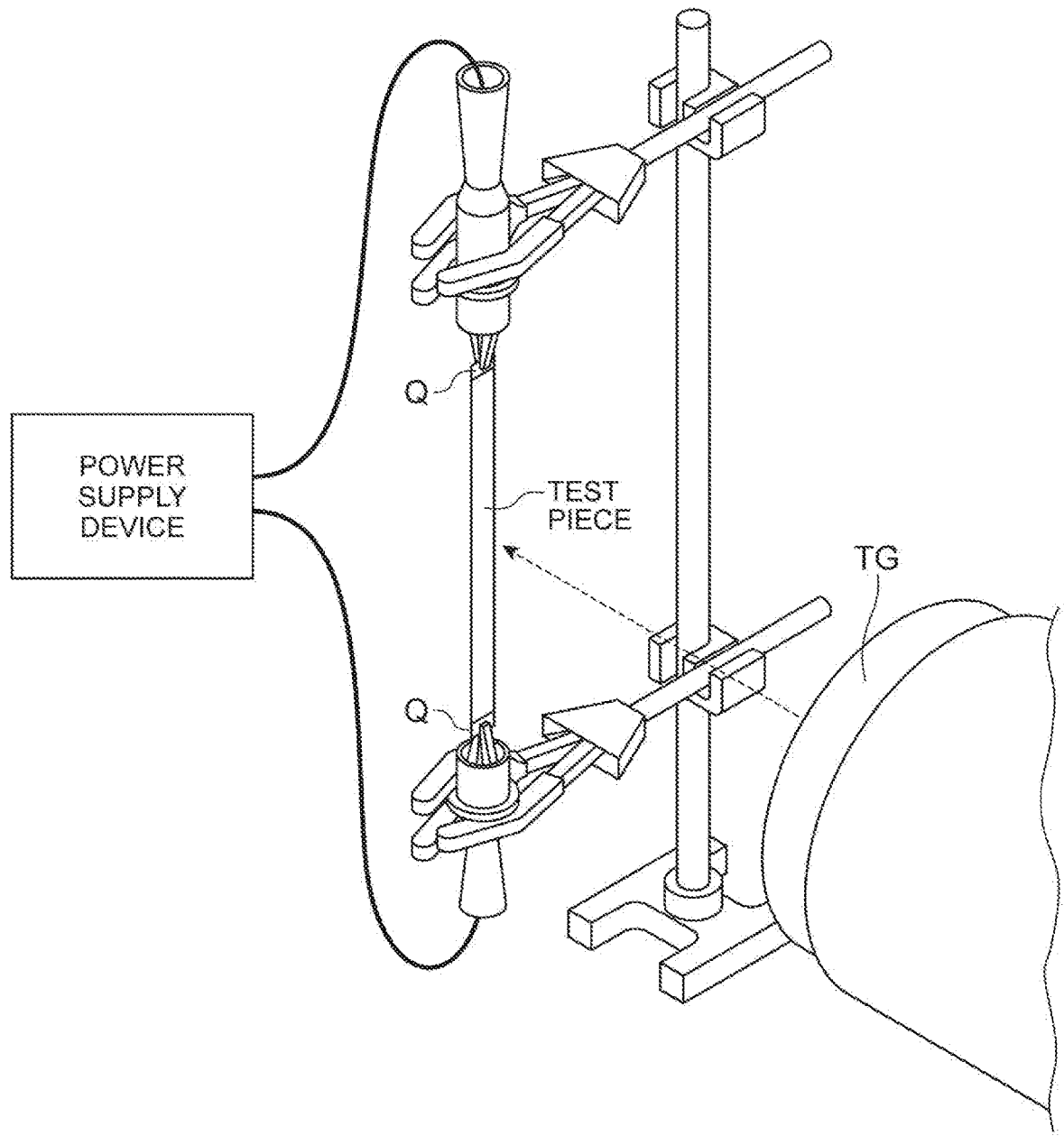
FIG. 9 is a schematic diagram illustrating an example arrangement for measuring heat generation characteristics and current-voltage characteristics of a test piece.

To measure the volume resistivity, the conductive copper foil adhesive tape was clamped at both ends of the test piece with a connection clip having a wiring cord connected to the power supply device, the test piece was hung in the vertical direction, and the surface temperature of the test piece was measured by thermography TG (cf. FIG. 9).

Figure 10:
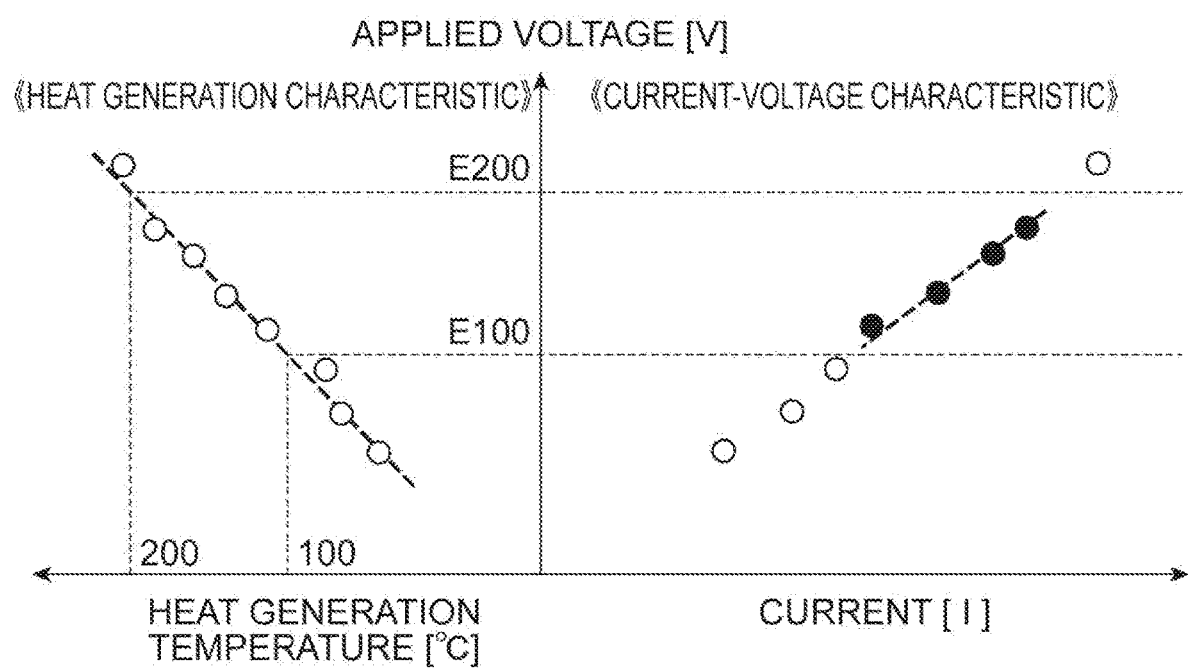
FIG. 10 is a composite plot graph of heat generation characteristics and of current-voltage characteristics for determining a volume resistivity during heat generation.

A voltage was applied from the power supply device to the test piece at intervals of 5 V. At that time, the maximum heating temperature and the amount of power supplied to the test piece were measured. From the "heat generation characteristics" and the "current-voltage characteristics" of the test piece obtained by repeating the above-described procedure (cf. FIG. 10), the minimum voltages E100 and E200 for the surface temperature of the test piece to reach 100° C. and 200° C. were determined. Next, the measured values (corresponding to the black circles ● in FIG. 10) existing in the range of E100 and E200 of the "current-voltage characteristics" were first-order approximated and the resistance value R of the test piece was determined from the obtained approximate expression. The volume resistivity ρv (Ω·cm) at the time of heat generation was determined according to the following equation (1).

$$\rho v = R \times \text{cross-sectional area } S / \text{length } L \quad (1)$$

2. Initial Applied Voltage

Figure 11:
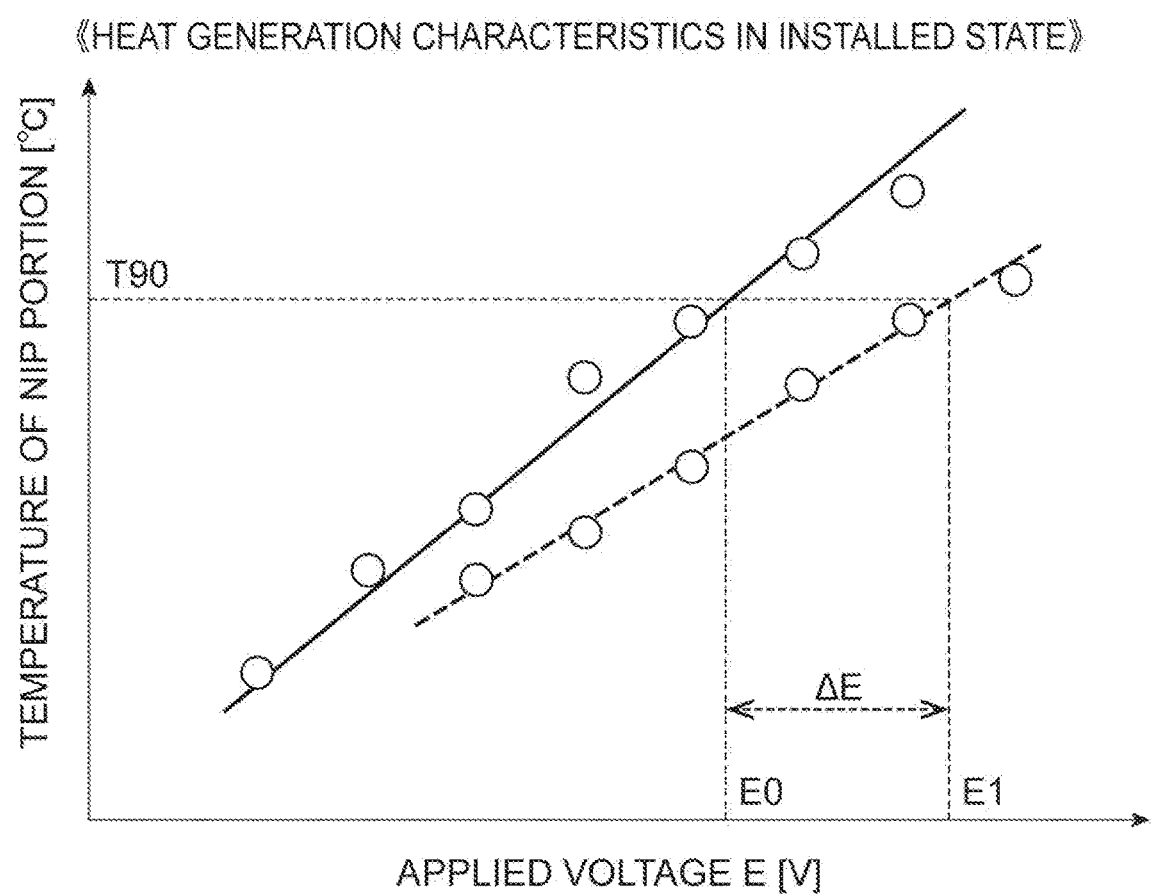
FIG. 11 is a graph of a temperature of the nip portion relative to a voltage applied, in an example fixing device for determining a voltage rise amount (fluctuation amount) after continuous paper feeding.

The fixing device was operated, the heating temperature of the NIP portion was measured while changing the voltage E applied to the electrode, and the heat generation characteristics in an installed state was evaluated (cf. FIG. 11). From the heat generation characteristic curve obtained, the initial voltage E0 (V) applied for the fixing rate of the toner image on the medium, to be 90% or more was obtained and evaluated according to the following standards.

A: E0<24 (Very good)
B: 24≤E0<28 (Good)
C: 28≤E0<32 (Acceptable level in the present disclosure)
D: E0≥32 (Impossible level in the present disclosure)

3. Voltage Rise after Continuous Paper Feeding

After the fixing operation for 50,000 sheets, the voltage E1 (V) applied for the fixing rate of the toner image on the medium to be 90% or more was obtained similarly to the initial applied voltage (cf. FIG. 11) and a variation ΔE (corresponding to E1-E0) from the initial applied voltage E0 was obtained and evaluated according to the following standards.

A: ΔE<0.7 (Very good)
B: 0.7≤ΔE<1.0 (Good)
C: 1.0≤ΔE<2.0 (Acceptable level in the present disclosure)
D: ΔE≥2.0 (Impossible level in the present disclosure)

4. Running Stability During Heating

After confirming that the non-energized endless belt (e.g., a belt not supplied with power) could run stably without meandering when the meandering prevention control was not performed, the initial applied voltage E0 was applied and the maximum meandering amount L (mm) of the heated endless belt was obtained and evaluated according to the following standards.

A: L<3 (Very good)
B: 3≤L<5 (Good)
C: 5≤L<10 (Acceptable level in the present disclosure)
D: L≥10 (Impossible level in the present disclosure)

Example 2

An evaluation test was performed similarly to "Example 1" with the exception that the "endless belt-2" obtained by "Production Example 2 of the endless belt" was used instead of the "endless belt-1".

As a result, since the volume resistivity ratio of the endless belt-2 was lower than that of the endless belt-1, the results were obtained were somewhat satisfactory although the running stability during heating and the unevenness of image gloss tended to deteriorate slightly. The details of the evaluation results are shown in Table 2A which appears further below.

Example 3

An evaluation test was performed similarly to "Example 1" with the exception that the "endless belt-3" obtained by "Production Example 3 of the endless belt" was used instead of the "endless belt-1".

As a result, since the CNT content of the endless belt-3 was less than that of the endless belt-1, the initial applied voltage increased. Further, since the volume resistivity ratio was high, the results obtained were substantially satisfactory although the voltage rise after continuous paper feeding and the running stability during heating also tended to deteriorate. The details of the evaluation results are shown in Table 2A further below.

Example 4

An evaluation test was performed similarly to "Example 1" with the exception that the "endless belt-4" obtained by "Production Example 4 of the endless belt" was used instead of the "endless belt-1".

As a result, since the volume resistivity ratio of the endless belt-4 was greater than that of the endless belt-1, the CNT content was high. Although there was a tendency that the voltage rise after continuous paper feeding deteriorated, the results obtained were substantially satisfactory. The details of the evaluation results are shown in Table 2B further below.

Example 5

An evaluation test was performed similarly to "Example 1" with the exception that the "endless belt-5" obtained by "Production Example 5 of the endless belt" was used instead of the "endless belt-1".

As a result, since the CNT content was further increased as compared to the endless belt-4, the results obtained were substantially satisfactory, although there was a tendency for the voltage rise after the continuous paper feeding due to the rigidity of the endless belt. The details of the evaluation results are shown in Table 2B further below.

Example 6

An evaluation test was performed similarly to "Example 1" with the exception that the "endless belt-6" obtained by "Production Example 6 of the endless belt" was used instead of the "endless belt-1".

As a result, since the CNT content of the endless belt-6 was less than that of the endless belt-1, the initial voltage applied as well as the volume resistivity ratio were relatively high. Accordingly, there was a tendency that the running stability during heating was deteriorated. In addition, although uneven gloss was observed in the fixed image obtained, all were at an acceptable level. The details of the evaluation results are shown in Table 2B further below.

Comparative Example 1

An evaluation test was performed similarly to "Example 1" with the exception that the "comparative endless belt-1" obtained by "Comparative Production Example 1 of the endless belt" was used instead of the "endless belt-1".

As a result, the initial applied voltage E0 was 28.8 V. Further, the maximum meandering amount L when the endless belt was heated exceeded 10 mm.

Additionally, after performing continuous printing for 50,000 sheets while performing meandering prevention control, the applied voltage E1 for maintaining the fixing rate of the toner image so as not to fall below 90% was evaluated again. As a result, the applied voltage E1 was 31.5 V and a variation (E1-E0) of the applied voltage accompanying the printout was +2.7 V. The details of the evaluation results are shown in Table 2B further below.

Comparative Example 2

An evaluation test was performed similarly to "Example 1" with the exception that the "comparative endless belt-2" obtained by "Comparative Production Example 2 of the endless belt" was used instead of the "endless belt-1".

As a result, the initial applied voltage E0 was 26.1 V. Further, the maximum meandering amount L when the endless belt was heated was 10 mm.

Furthermore, after performing continuous printing for 50,000 sheets while performing meandering prevention control, the applied voltage E1 for maintaining the fixing rate of the toner image so as not to fall below 90% was evaluated again. As a result, the applied voltage E1 was 27.7 V and a variation (E1-E0) of the applied voltage accompanying the printout was +1.6 V. The details of the evaluation results are shown in Table 2B further below.

TABLE 2A

| | | Example-1 | Example-2 | Example-3 | Example-4 |
|---|---|---|---|---|---|
| Endless belt | | Endless belt-1 | Endless belt-2 | Endless belt-3 | Endless belt-4 |
| Evaluation result | Initial applied voltage | A | A | C | A |
| | Running stability during heating | A | A | B | B |
| | Unevenness of image gloss | A | B | A | B |
| | Voltage rise after continuous paper feeding | A | A | C | A |

TABLE 2B

| | | Example-5 | Example-6 | Comparative Example-1 | Comparative Example-2 |
|---|---|---|---|---|---|
| Endless belt | | Endless belt-5 | Endless belt-6 | Comparative endless belt-1 | Comparative endless belt-2 |
| Evaluation result | Initial applied voltage | A | C | B | A |
| | Running stability during heating | C | C | D | D |
| | Unevenness of image gloss | B | C | A | A |
| | Voltage rise after continuous paper feeding | C | B | D | C |

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An electrothermal heating device for heating a print medium, the electrothermal heating device comprising:
   an endless belt to rotate in a rotational direction about a rotation axis that defines an axial direction in order to generate heat when the endless belt rotates and is supplied with power, wherein the endless belt includes a base portion, and wherein a volume resistivity of the base portion of the endless belt in the rotational direction is less than a volume resistivity of the base portion in the axial direction; and
   a first electrode, a second electrode, and a third electrode that are in contact with the base portion of the endless belt, wherein the first electrode, the second electrode, and the third electrode extend in the axial direction of the endless belt, and are spaced apart in the rotational direction of the endless belt, wherein the first electrode is on a first side of a nip portion of the endless belt, the second electrode is on a second side of the nip portion, and the third electrode is on the nip portion between the first electrode and the second electrode, and wherein the third electrode is closer to the first electrode than the second electrode such that a first portion of the nip between the first electrode and the third electrode has a different heat generation state than a second portion of the nip between the second electrode and the third electrode.

2. The electrothermal heating device according to claim 1, wherein a ratio of the volume resistivity of the base portion of the endless belt in the rotational direction with respect to the volume resistivity of the base portion of the endless belt in the axial direction is of approximately 0.50 to 0.95.

3. The electrothermal heating device according to claim 1, wherein a ratio of the volume resistivity of the base portion of the endless belt in the rotational direction with respect to the volume resistivity of the base portion of the endless belt in the axial direction is of approximately 0.60 to 0.85.

4. The electrothermal heating device according to claim 1, wherein the endless belt includes a surface layer that forms an outer surface of the endless belt, wherein the base portion corresponds to an inner layer forming an inner surface of the endless belt, wherein a thickness of the surface layer is approximately ½ or less of a thickness of the base portion, and wherein a volume resistivity of the surface layer is approximately ten times or more a volume resistivity of the base portion in the rotational direction.

5. The electrothermal heating device according to claim 4, wherein the surface layer is made of a material containing a fluorine-based resin.

6. The electrothermal heating device according to claim 5, wherein the endless belt includes an intermediate layer that is located between the surface layer and the base portion,
wherein the intermediate layer is made of a material containing silicone rubber, and
wherein a thickness of the intermediate layer is of approximately 0.3 mm to 3 mm.

7. The electrothermal heating device according to claim 1, wherein the base portion includes a nanocomposite material having a carbon filler dispersed therein.

8. The electrothermal heating device according to claim 7, wherein a content of the carbon filler in the nanocomposite material is of approximately 3% by mass to 25% by mass.

9. The electrothermal heating device according to claim 7, wherein a content of the carbon filler in the nanocomposite material is of approximately 5% by mass to 20% by mass.

10. The electrothermal heating device according to claim 7, wherein the carbon filler has an average particle diameter of approximately 2 nm to 20 nm and a ratio of a length with respect to a diameter of the carbon filler is of approximately 100 to 15,000.

11. The electrothermal heating device according to claim 7, wherein the carbon filler is made of a material containing at least a carbon nanotube.

12. An electrothermal heating device comprising:
an endless belt to convey and to heat a sheet member, the endless belt having a tubular shape extending along an axis that defines an axial direction of the endless belt, the endless belt to rotate about the axis in a rotational direction; and
a pair of electrodes including a first electrode, a second electrode, and a third electrode, wherein the first electrode, the second electrode, and the third electrode extend parallel to the axial direction of the endless belt, and are spaced apart in the rotational direction of the endless belt to generate electrical energy in the endless belt, wherein the first electrode is on a first side of a nip portion of the endless belt, the second electrode is on a second side of the nip portion, and the third electrode is on the nip portion between the first electrode and the second electrode, and wherein the third electrode is closer to the first electrode than the second electrode such that a first portion of the nip between the first electrode and the third electrode has a different heat generation state than a second portion of the nip between the second electrode and the third electrode.

13. The electrothermal heating device according to claim 12, further comprising:
a pressing roller extending in the axial direction adjacent the endless belt; and
a pressing member extending in the axial direction to press the endless belt against the pressing roller to form a contact region between the pressing roller and the endless belt,
wherein the contact region extends in the rotational direction between the first electrode and the second electrode.

14. The electrothermal heating device according to claim 12, wherein a thickness of at least one of the first electrode and the second electrode is approximately 1.5 times or less a thickness of a base portion of the endless belt.

15. The electrothermal heating device according to claim 12, wherein a thickness of a base portion of the endless belt is of approximately 30 μm to 100 μm.

16. The electrothermal heating device according to claim 12, wherein a thickness of a base portion of the endless belt is of approximately 45 μm to 90 μm.

17. The electrothermal heating device according to claim 12,
wherein the endless belt comprises a nanocomposite material that includes a carbon filler,
wherein the nanocomposite material has a first volume resistivity in the rotational direction of the endless belt that is less than a second volume resistivity in the axial direction of the endless belt, and
wherein the pair of electrodes including the first electrode and the second electrode are in contact with the nanocomposite material of the endless belt.

* * * * *